US011117436B2

(12) United States Patent
Chang et al.

(10) Patent No.: US 11,117,436 B2
(45) Date of Patent: Sep. 14, 2021

(54) VEHICLE SUSPENSION SYSTEM

(71) Applicant: KUBOTA CORPORATION, Osaka (JP)

(72) Inventors: Eric Chang, Buford, GA (US); John White, Gainesville, GA (US)

(73) Assignee: KUBOTA CORPORATION, Osaka (JP)

(*) Notice: Subject to any disclaimer, the term of this patent is extended or adjusted under 35 U.S.C. 154(b) by 69 days.

(21) Appl. No.: 16/415,247

(22) Filed: May 17, 2019

(65) Prior Publication Data

US 2020/0361409 A1 Nov. 19, 2020

(51) Int. Cl.
*B60G 21/055* (2006.01)

(52) U.S. Cl.
CPC ....... *B60G 21/0551* (2013.01); *B60G 21/055* (2013.01); *B60G 2200/144* (2013.01); *B60G 2202/1351* (2013.01); *B60G 2204/1224* (2013.01)

(58) Field of Classification Search
CPC .......... B60G 21/055; B60G 21/0551; B60G 21/026; B60G 21/051; B60G 2204/1224; B60G 2204/122; B60G 2204/1222; B60G 2204/1226; B60G 2200/144; B60G 2202/1351; B60G 2202/135; B60G 2202/1362

USPC .... 280/124.152, 124.137, 124.107; 267/183, 267/188

See application file for complete search history.

(56) References Cited

U.S. PATENT DOCUMENTS 7,322,591 B2   1/2008  Seki

FOREIGN PATENT DOCUMENTS

FR    2874859 A1 *  3/2006 ........... B60G 21/055

* cited by examiner

*Primary Examiner* — Keith J Frisby
(74) *Attorney, Agent, or Firm* — Greenblum & Bernstein, P.L.C.

(57) ABSTRACT

A vehicle suspension system includes suspension arms mounted to a vehicle body frame to be pivotable between a low rolling posture and a high rolling posture and an anti-roll bar unit. The anti-roll bar unit includes a main anti-roll bar and a sub anti-roll bar. The sub anti-roll bar extends at least partially parallel with the main anti-roll bar. In the low rolling posture of the suspension arms, the main anti-roll bar and the sub anti-roll bar are not in contact with each other. In the high rolling posture of the suspension bars, the main anti-roll bar and the sub anti-roll bar are in contact with each other to increase stiffness of the anti-roll bar unit.

7 Claims, 6 Drawing Sheets

VEHICLE SUSPENSION SYSTEM

TECHNICAL FIELD

This invention relates to a vehicle suspension system having an anti-roll bar.

BACKGROUND ART

In the case of an independent suspension in which a left wheel and a right wheel are suspended independently, in the course of traveling at a corner, an acceleration in the lateral direction affecting the vehicle body causes a stroke difference between the left wheel and the right wheel, which causes rolling of the vehicle body. In order to reduce such vehicle body rolling, an anti-roll bar functioning as a torsion spring having U-shape in a plan view interconnects a left suspension arm with a right suspension arm. For instance, U.S. Pat. No. 7,322,591 discloses a vehicle suspension in which a left suspension arm and a right suspension arm are interconnected via an anti-roll bar. A torsion spring constant is determined in consideration to a torsional moment which increases with increase of the stroke difference between the wheels. The torsional stiffness which is determined by the torsion spring constant of this anti-roll bar affects riding feel and handling performance. However, since the torsion spring constant is a characteristic value determined by shape and material of the anti-roll bar, it is difficult for a single anti-roll bar to provide a torsional stiffness which is appropriate over the entire range of stroke difference between the left wheel and the right wheel.

This problem can be effectively solved by an active suspension system configured to dynamically change the characteristics of the suspension via an electronic control. However, this system requires a costly sensor and actuator as well as a controller therefor. Therefore, this system is complicated in its configuration and costly in its manufacture and maintenance costs.

SUMMARY OF THE INVENTION

An object of the present invention is to provide a vehicle suspension system having an anti-roll bar with an appropriate torsional stiffness though a simple configuration.

A vehicle suspension system according to the present invention includes left and right suspension arms mounted to a vehicle body frame to be pivotable between a low rolling posture and a high rolling posture and an anti-roll bar unit that bridges the left suspension arm with the right suspension arm. The anti-roll bar unit includes a main anti-roll bar and a sub anti-roll bar. The main anti-roll bar has a left end operably attached to the left suspension arm and a right end operably attached to the right suspension arm. The sub anti-roll bar extends at least partially parallel with the main anti-roll bar. In the low rolling posture, the main anti-roll bar and the sub anti-roll bar are not in contact with each other; and in the high rolling posture, the main anti-roll bar and the sub anti-roll bar are in contact with each other to increase stiffness of the anti-roll bar unit.

Incidentally, the low rolling posture includes a neutral state (neutral posture) in which strokes of the left and right suspension arms are equal to each other. Namely, the low rolling posture refers to a vehicle posture in which strokes of the left and right suspension arms are equal to each other or only slightly different from each other. In this, a rolling angle of the vehicle body is zero or below a predetermined angle. Whereas, the high rolling posture refers to a vehicle posture in which the rolling angle of the vehicle body exceeds the predetermined rolling angle.

The anti-roll bar unit employed in this invention comprises a double anti-roll bar, having a main anti-roll bar and a sub anti-roll bar. The main anti-roll bar functions as a torsion spring in both the low rolling posture and the high rolling posture of the left and right suspension arms, namely, in the entire range of stroke difference between the left and right suspension arms. In contrast, the sub anti-roll bar can "float" relative to the left and right suspension arms in the low rolling posture of the left and right suspension arms. This sub anti-roll bar functions as a torsion spring only in the high rolling posture.

In a normal traveling condition, the left and right suspension arms will be kept under the low rolling posture, so this antiroll bar unit ensures a comfortable riding feel and good handling performance provided by the conventional suspension comprised of a single anti-roll bar. Further, in a severe traveling condition such as sharp cornering, this anti-roll bar unit functions as a strong torsion spring through the combination of the main antiroll bar and the sub anti-roll bar, thus ensuring stability under such severe traveling condition also. The inventive vehicle suspension system employing such double anti-roll bar can provide superior riding feel and handling performance in both a normal traveling condition and a severe traveling condition, in spite of its simple arrangement.

Preferably, the main anti-roll bar and the sub anti-roll bar come into contact with each other via an elastic member such as a rubber isolator, in order to reduce noise and/or vibration caused when the main anti-roll bar and the sub anti-roll bar come into contact and become combined with each other.

DETAILED DESCRIPTION

Next, an embodiment of a vehicle suspension system according to the present invention will be explained. In this embodiment, the vehicle suspension system is applied to a multi-purpose vehicle (utility vehicle). Incidentally, in this detailed description, unless indicated otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

Figure 1:
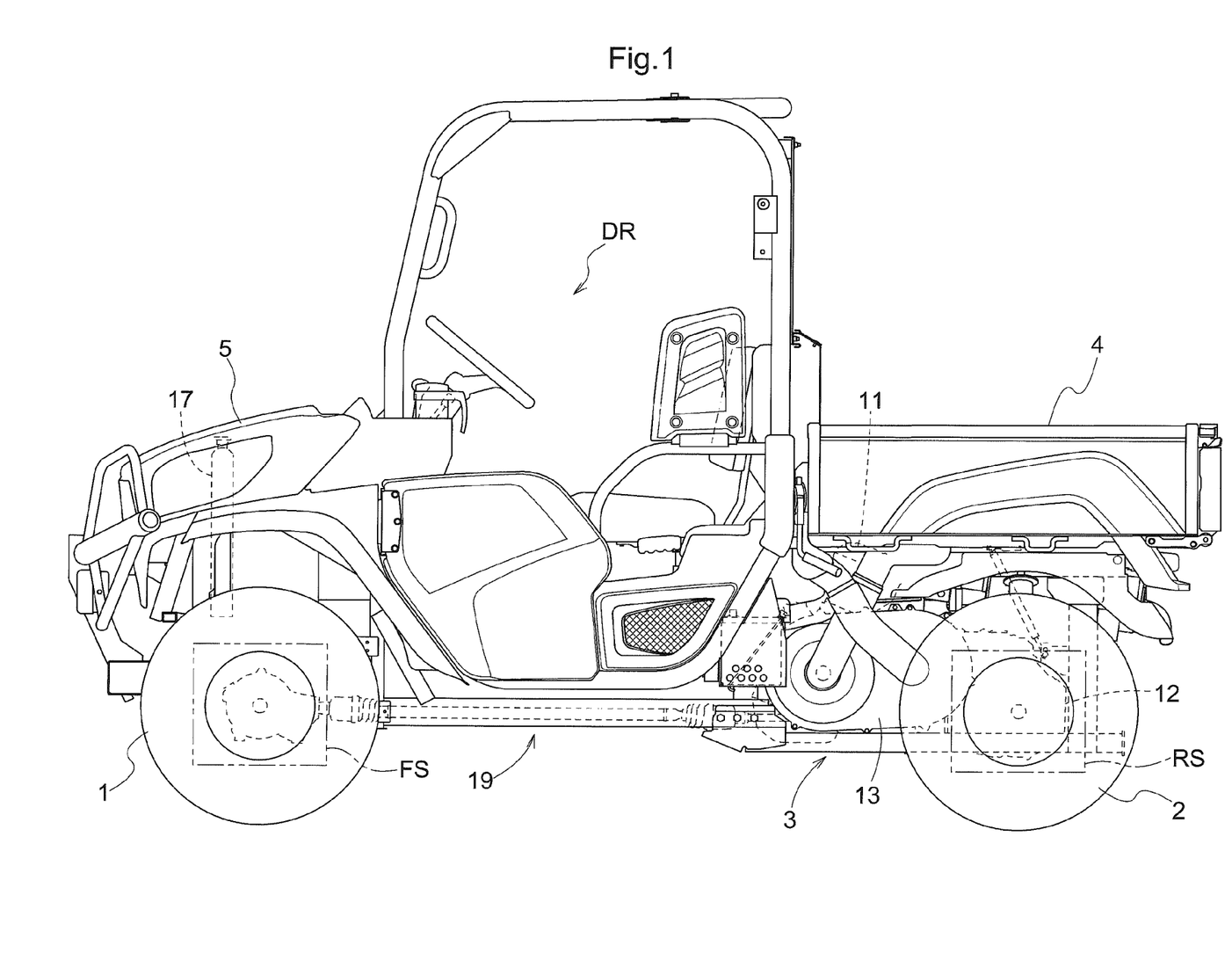
FIG. 1 is a side view of a multi-purpose vehicle.
Figure 2:
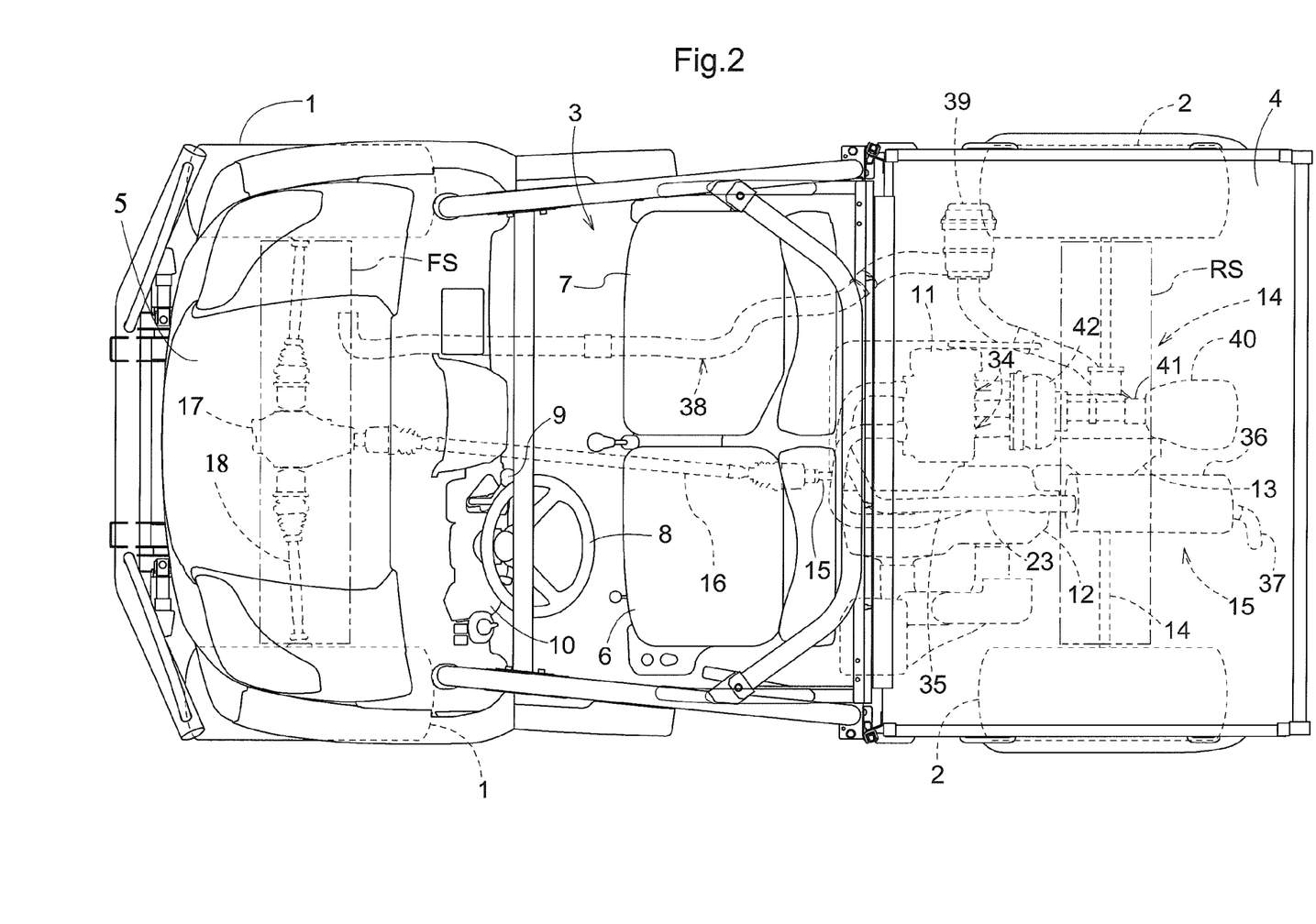
FIG. 2 is a plan view of the multi-purpose vehicle.

FIG. 1 is a side view of the multi-purpose vehicle. FIG. 2 is a plan view of the multi-purpose vehicle. Such multi-purpose vehicle is a vehicle for use in a variety of purposes such as transportation of load, a recreational activity, etc. This multi-purpose vehicle includes a pair of left and right front wheels 1 that can be steered and driven, a pair of left and right rear wheels 2 that can be driven and a vehicle body frame 3. On the vehicle body frame 3, there are provided a driving chamber DR in which a driver (operator) will ride, a load deck 4 capable of mounting a load, and an engine 11 located under the load deck 4. At a front portion of the vehicle body frame 3, there is provided a hood 5 which can be opened/closed.

Though shown only schematically in FIG. 1 and FIG. 2, there are provided a front suspension device FS for independently suspending the left and right front wheels 1 from the vehicle body frame 3 and a rear suspension device RS for independently suspending the left and right rear wheels 2 from the vehicle body frame 3. The front suspension device FS and the rear suspension device RS are double wishbone suspensions.

As shown in FIG. 2, power of the engine 11 is speed-changed steplessly through a stepless speed changer device 12 and then transmitted to a rear transmission 13. This rear transmission 13 includes a gear type speed changer mechanism providing forward traveling states (a forward first speed state and a forward second speed state), a reverse traveling stage and a neutral state. Power from the rear transmission is transmitted to a rear axle 14 and then transmitted from this rear axle 14 to the left and right rear wheels 2. Further, the power from the rear transmission 13 is transmitted via a PTO (power takeoff) shaft 15, a propelling shaft 16 and a front transmission 17 to a front axle 18. The front axle 18 is connected with the left and right front wheels 1.

Figure 3:
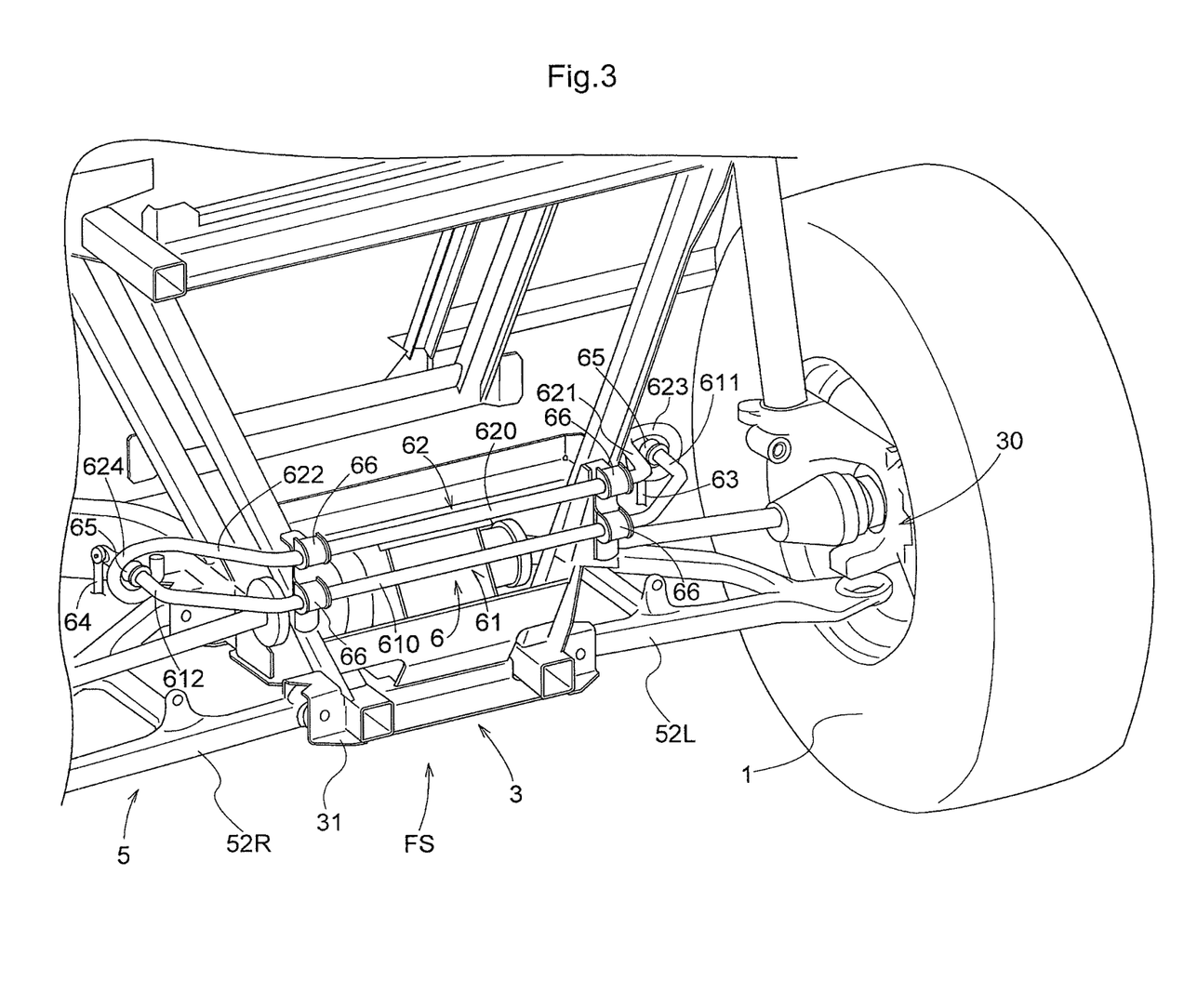
FIG. 3 is a perspective view showing a vehicle body frame and a vehicle suspension system.
Figure 4:
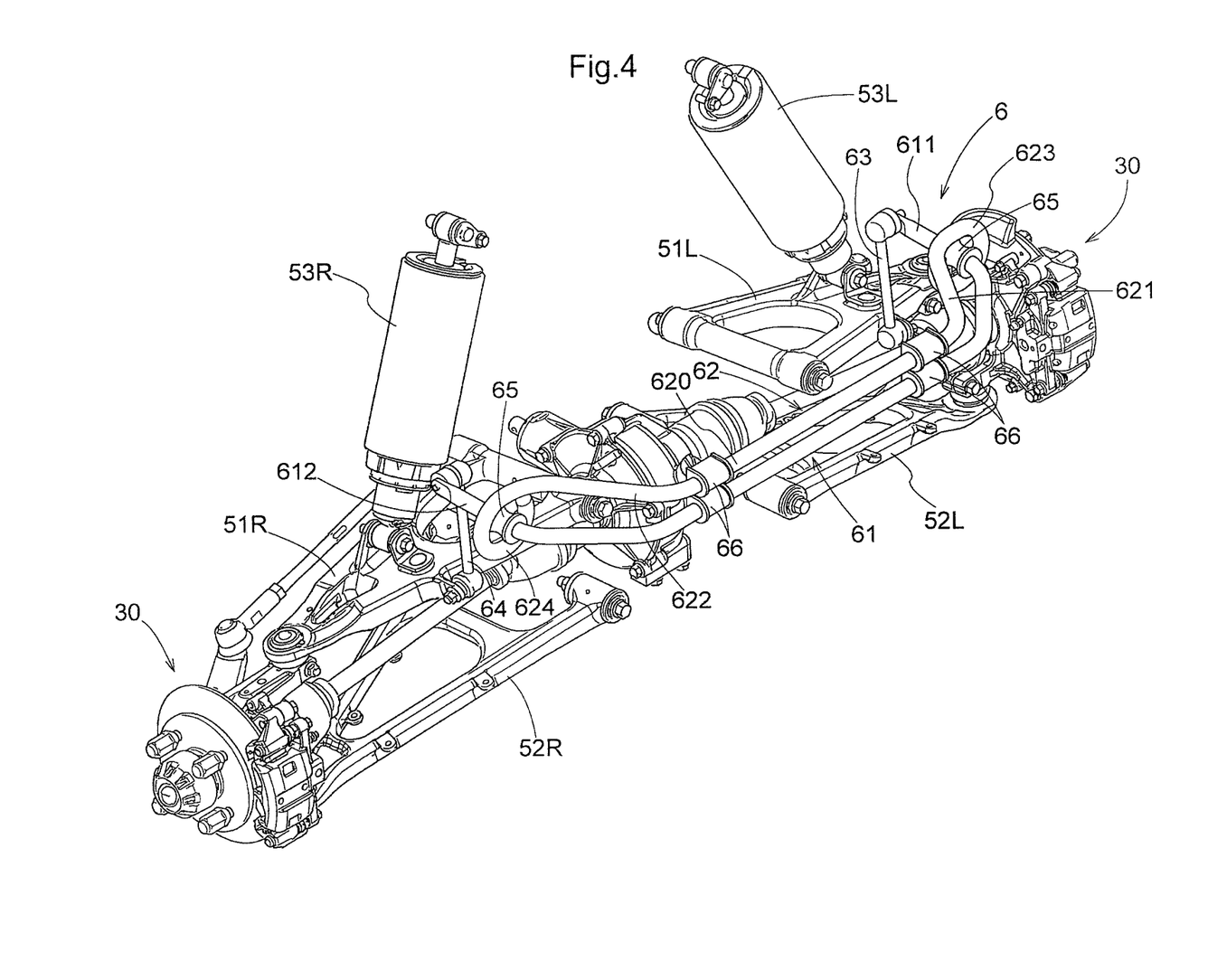
FIG. 4 is a perspective view showing the vehicle suspension system.

FIG. 3 shows the front suspension device FS mounted at a front portion of the vehicle body frame 3. FIG. 4 shows the front suspension device FS only. A left upper suspension arm 51L and a left lower suspension arm 52L together constituting the left suspension arm are attached to a front left portion of the vehicle body frame 3 via a bracket 31 to be pivotable up/down. A right upper suspension arm 51R and a right lower suspension arm 52R together constituting the right suspension arm are attached to a front right portion of the vehicle body frame 3 via a bracket 31 to be pivotable up/down. Free ends of the left upper suspension arm 51L and the left lower suspension arm 52L are connected to the left front wheel 1 via a knuckle arm unit 30. Free ends of the right upper suspension arm 51R and the right lower suspension arm 52R are connected to the right front wheel 1 via a knuckle arm unit 30.

Between and across the left upper suspension arm 51L and the vehicle body 3, a left cushion unit 53L is provided. Between and across the right upper suspension arm 51R and the vehicle body 3, a right cushion unit 53R is provided. The left cushion unit 53L and the right cushion unit 53R respectively is comprised of a coil spring and a damper unit. When an acceleration in the lateral direction is applied to the vehicle body in the course of e.g. a cornering, there will develop a difference between the stroke of the left cushion unit 53L (the stroke of the left suspension arm) and the stroke of the right cushion unit 53R (the stroke of the right suspension arm). Due to this stroke difference, the vehicle body will roll. Here, a posture in which the vehicle body rolls within a predetermined rolling angle is referred to a low rolling posture and a posture in which the vehicle body rolls at an angle exceeding the predetermined rolling angle is referred to as a high rolling posture. The vehicle posture in which the rolling angle of the vehicle body is substantially zero is referred to as a neutral posture in particular.

Figure 5:
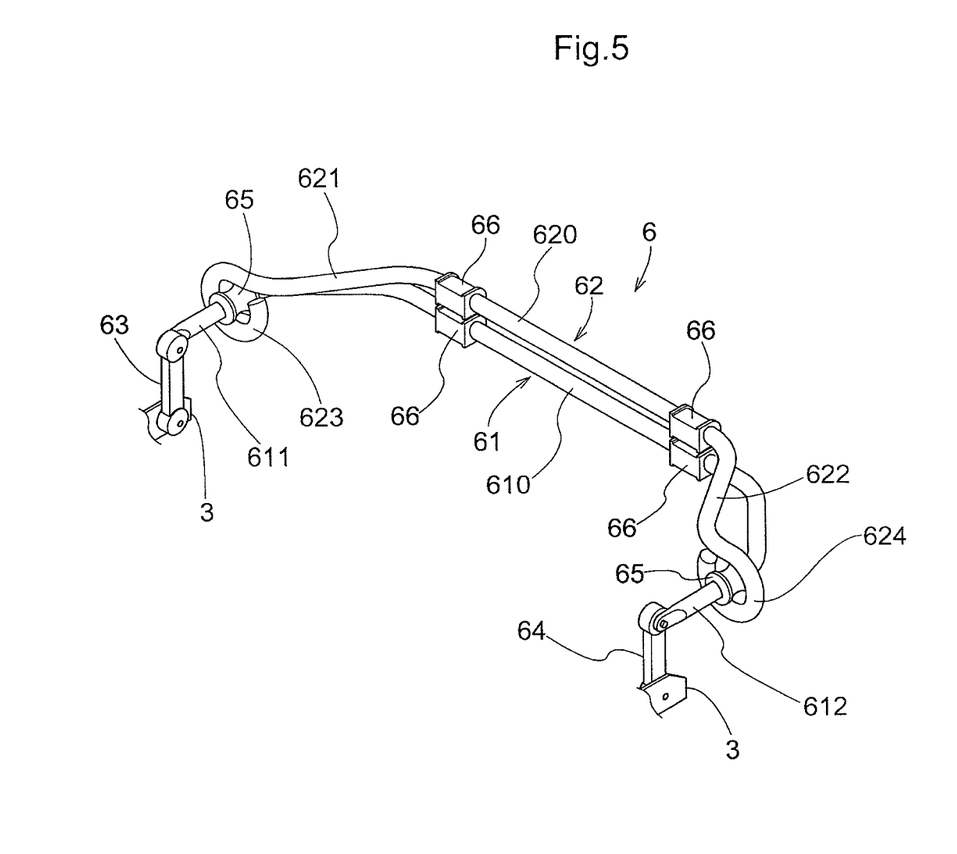
FIG. 5 is a perspective view of an anti-roll bar unit.

In order to suppress such rolling of the vehicle body due to a stroke difference between the stroke of the left suspension arm and the stroke of the right suspension arm, there is provided an antiroll bar unit 6 which bridges the left suspension arm with the right suspension arm. This anti-roll bar unit 6, as shown in FIG. 5, includes a main anti-roll bar 61 and a sub anti-roll bar 62.

The main anti-roll bar 61 has an approximately C-shape as seen in a plan view and includes a main bar body 610 which extends straight in the vehicle body transverse direction, a left main arm 611 which is bent from the left end of the main bar body 610 and extends rearwards in the vehicle body front/rear direction, and a right main arm 612 which is bent from the right end of the main bar body 610 and extends rearwards in the vehicle body front/rear direction. The right main arm 612 is connected to the vehicle body frame 3 via a right link 64. For the connection between the right link 64 and the right main bar 612 and the connection between the right link 64 and the vehicle body frame 3, ball joints or pin joints are employed. The main bar body 610, the left main arm 611 and the right main arm 612 are formed by bending of a single round bar.

The sub anti-roll bar 62 has an approximately U-shape as seen in a plan view and includes a sub bar body 620 extending straight in the vehicle body transverse direction, a left sub arm 621 which is bent from the left end of the sub bar body 620 and extends rearwards in the vehicle body front/rear direction and a right sub bar arm 622 which is bent from the right end of the sub bar body 620 and extends rearwards in the vehicle body front/rear direction.

The leading end region of the left sub arm 621 is formed as a left ring 623. Similarly, the leading end region of the right sub arm 622 is formed as a right ring 624. The left ring 623 and the right ring 624 are formed to follow a plane perpendicular to the vehicle body front/rear direction line. The sub bar body 620, the left sub arm 621 and the right sub arm 622 are formed by bending a single round bar.

Figure 6:
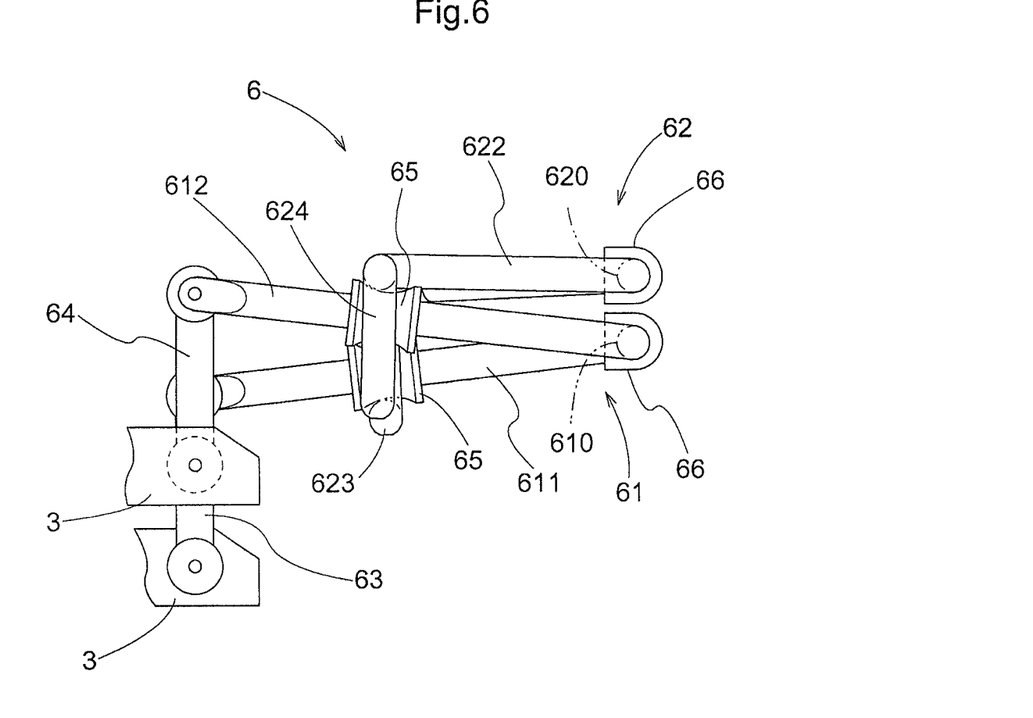
FIG. 6 is a side view of the anti-roll bar unit.
Figure 7:
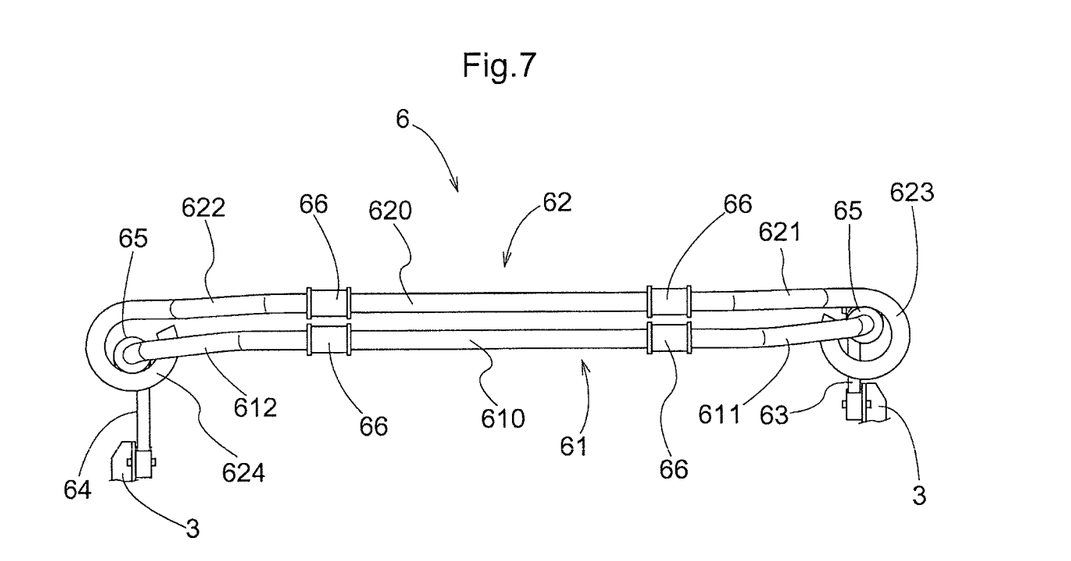
FIG. 7 is a front view of the anti-roll bar unit.

As shown in FIG. 5, FIG. 6 and FIG. 7, the main anti-roll bar 61 and the sub anti-roll bar 62 are assembled in such a manner that the main bar body 610 and the sub bar body 620 extend substantially parallel with each other, in which the left main arm 611 extends through the opening formed by the left ring 623 and the right main arm 612 extends through the opening formed by the right ring 624.

As shown in FIG. 3, the main bar body 610 and the sub bar body 620 are supported via two bushes 66 fixed to the vehicle body frame 3 with using brackets and spaced apart from each other to be torsionably rotatable.

The main anti-roll bar 61 and the sub anti-roll bar 62 are supported to the vehicle body frame 3 via bushes 66. However, the opposed ends of the sub anti-roll bar 62 are kept free, whereas the opposed ends of the main anti-roll bar 61 are fixed to the vehicle body frame 3 via the left link 63 and the right link 64. Therefore, when the strokes of the left and right suspensions differ from each other, there will occur a relative positional displacement between the main anti-roll bar 61 and the sub anti-roll bar 62.

When the posture (vehicle posture) of the suspension device is the neutral posture (in which the rolling angle is substantially zero), the left main arm 611 of the main anti-roll bar 61 will be located substantially at the center of the opening of the left ring 623 of the sub anti-roll bar 62. Similarly, the right main arm 612 of the main anti-roll bar 61 will be located substantially at the center of the opening of the right ring 624 of the sub anti-roll bar 61.

When the posture (vehicle posture) of the suspension device is the low rolling posture (the rolling angle is within the predetermined rolling angle), the left main arm 611 is located within the opening of the left ring 623, not in contact therewith. Similarly, the right main arm 612 is located within the opening of the right ring 624, not in contact therewith.

When the posture (vehicle posture) of the suspension device is the high rolling posture (the rolling angle exceeds the predetermined rolling angle), the left main arm 611 will come into contact with the inner circumferential wall of the left ring 623 and the right main arm 621 will come into contact with the inner circumferential wall of the right ring 624, thus combining the main anti-roll bar 61 with the sub anti-roll bar 62. With this, a torsional moment applied to the main anti-roll bar 61 will be received by the main anti-roll bar 61 and the sub anti-roll bar 62. Namely, the stiffness of the anti-roll bar unit 6 will be increased thereby.

In order to reduce noise and/or vibration at the time of contact between the left main arm 611 and the inner circumferential wall of the left ring 623, a sleeve-like rubber-formed isolator 65 is engaged on the left main arm 611. Similarly, in order to reduce noise and/or vibration at the time of contact between the right main arm 612 and the inner circumferential wall of the right ring 624, a sleeve-like rubber-formed isolator 65 is engaged on the right main arm 612. Incidentally, instead of the above-described arrangements, the rubber-formed isolators 65 can be provided in the left ring 623 and the right ring 624, respectively.

In the meantime, the arrangements disclosed in the foregoing embodiment (including the further embodiment) can be used in combination with arrangements disclosed in the other embodiments as long as such combination does not result in contradiction. Further, it is understood that the embodiments disclosed in this detailed disclosure are only illustrative, and the scope of the present invention is not limited thereto. In fact, various modifications can be made appropriately within a range not deviating from the essence of the invention.

The invention claimed is:

1. A vehicle suspension system comprising:
   left and right suspension arms mounted to a vehicle body frame to be pivotable between a low rolling posture and a high rolling posture; and
   an anti-roll bar unit that bridges the left suspension arm with the right suspension arm, the anti-roll bar unit including:
      a main anti-roll bar having a left end operably attached to the left suspension arm and a right end operably attached to the right suspension arm; and
      a sub anti-roll bar extending at least partially parallel with the main anti-roll bar;
      wherein in the low rolling posture, the main anti-roll bar and the sub anti-roll bar are not in contact with each other; and in the high rolling posture, the main anti-roll bar and the sub anti-roll bar are in contact with each other to increase stiffness of the anti-roll bar unit, and
      wherein the main anti-roll bar and the sub anti-roll bar are pivotally supported to the vehicle body frame.

2. The vehicle suspension system of claim 1, wherein:
   the main anti-roll bar includes a main bar body which extends straight in the vehicle body transverse direction, a left main arm which is bent from the left end of the main bar body and extends rearwards in the vehicle body front/rear direction, a right main arm which is bent from the right end of the main bar body and extends rearwards in the vehicle body front/rear direction, a left link having one end connected to the left main arm and the other end connected to the left suspension arm and a right link having one end connected to the right main arm and the other end connected to the right suspension arm; and
   the sub anti-roll bar includes a sub bar body extending straight in the vehicle body transverse direction, a left sub arm which is bent from the left end of the sub bar body and extends rearwards in the vehicle body front/rear direction and a right sub bar arm which is bent from the right end of the sub bar body and extends rearwards in the vehicle body front/rear direction.

3. The vehicle suspension system of claim 2, wherein:
   the leading end region of the left sub arm is formed as a left ring through which the left main arm extends, an inner circumferential wall of the left ring coming into contact with the left main arm in the high rolling posture; and
   the leading end region of the right sub arm is formed as a right ring through which the right main arm extends, an inner circumferential wall of the right ring coming into contact with the right main arm in the high rolling posture.

4. The vehicle suspension system of claim 3, wherein:
   the inner circumferential walls of the left ring and the right ring respectively come into contact with the left main arm and the right main arm via an elastic member.

5. The vehicle suspension system of claim 2, wherein:
   the main bar body and the sub bar body respectively are attached to the vehicle body frame via a bush.

6. A vehicle suspension system comprising:
   left and right suspension arms mounted to a vehicle body frame to be pivotable between a low rolling posture and a high rolling posture; and
   an anti-roll bar unit that bridges the left suspension arm with the right suspension arm, the anti-roll bar unit including:
   a main anti-roll bar having a left end operably attached to the left suspension arm and a right end operably attached to the right suspension arm; and
   a sub anti-roll bar extending at least partially parallel with the main anti-roll bar;
   wherein in the low rolling posture, the main anti-roll bar and the sub anti-roll bar are not in contact with each other; and in the high rolling posture, the main anti-roll bar and the sub anti-roll bar are in contact with each other to increase stiffness of the anti-roll bar unit,
   wherein the main anti-roll bar and the sub anti-roll bar are mounted independently of each other, and
   wherein ends of the sub anti-roll bar encircle ends of the main anti-roll bar and the encircled ends of the sub anti-roll bar are not in contact with the main anti-roll bar in the low rolling posture but are in contact with the main anti-roll bar in the high rolling posture.

7. A vehicle suspension system comprising:
   left and right suspension arms mounted to a vehicle body frame to be pivotable between a low rolling posture and a high rolling posture; and
   an anti-roll bar unit that bridges the left suspension arm with the right suspension arm, the anti-roll bar unit including:
   a main anti-roll bar having a left end operably attached to the left suspension arm and a right end operably attached to the right suspension arm; and a sub anti-roll bar extending at least partially parallel with the main anti-roll bar;

wherein in the low rolling posture, the main anti-roll bar and the sub anti-roll bar are not in contact with each other; and in the high rolling posture, the main anti-roll bar and the sub anti-roll bar are in contact with each other to increase stiffness of the anti-roll bar unit, wherein the main anti-roll bar and the sub anti-roll bar are mounted independently of each other, and wherein elongated portions of the main anti-roll bar and the sub anti-roll bar extend parallel to one another and are vertically aligned when mounted.

\* \* \* \* \*